3,230,077
PRODUCTION OF REFRACTORY METALS
Dale M. Hiller, Wilmington, Del., assignor to E. I. du Pont de Nemours and Company, Wilmington, Del., a corporation of Delaware
No Drawing. Filed Nov. 5, 1962, Ser. No. 236,162
6 Claims. (Cl. 75—84.5)

This invention relates to the preparation of niobium and tantalum metals and more particularly to novel methods for stabilizing lower chloride-containing niobium and tantalum pentachlorides when employed as intermediates in the production of said refractory metals.

More specifically, the invention pertains to the stabilization of vaporous niobium and tantalum pentachlorides containing $NbCl_4$, $TaCl_4$ or other lower chlorides in order to overcome objectionable line or apparatus plugging encountered due to the decomposition of such lower chlorides during plant handling, use or passage of the pentachlorides or their mixtures through vessels, conduits, transfer lines or equipment used in the processing or reduction of the pentachlorides.

Niobium and tantalum pentachlorides are well-known chemical intermediates which on reduction yield niobium and tantalum adaptable for fabrication into high-strength alloys for use in space vehicles, rocket engines, nuclear devices, atomic power equipment, and other applications. They can be obtained by chlorinating at elevated temperatures the minerals columbite ($FeNb_2O_6$), tantalite ($Fe_2Ta_2O_6$), or mixtures of niobium and tantalum oxides in combination with iron, such as $Fe[(Nb—Ta)O_3]_2$. Reduction of the purified pentachloride recovered from the chlorination can then be effected by reaction with an active reducing metal, such as sodium, or a gaseous reducing agent such as hydrogen, the reaction being conducted in a closed reactor maintained at an elevated temperature ranging from about 700–950° C. and in the absence of oxygen, nitrogen or carbon contaminants. Preferred, highly useful methods for accomplishing the hydrogen reduction comprise those disclosed in U.S. 3,020,148, issued February 6, 1962, to W. A. Jenkins and H. W. Jacobson.

The pentachlorides are reactive transition metal halides which are quite similar in physical and chemical properties. Thus, $TaCl_5$ has a vapor pressure of 1 atm. at 233° C. and has a 215° C. melting point while $NbCl_5$ has a vapor pressure of 1 atm. at 247° C. and melts at 205° C. The metals niobium and tantalum form well known lower chlorides, e.g. $MCl_4$, $MCl_3$, and $MCl_2$ (M being tantalum or niobium) which are solids and sublime with decomposition at elevated temperatures. At 420° C. and a pressure of 22 atmospheres, the five phases of niobium chlorides, —$NbCl_3$ (solid), $NbCl_4$ (solid), $NbCl_5$ (liquid), $NbCl_4$ and $NbCl_5$ (gas), coexist in equilibrium. The corresponding chlorides of tantalum behave similarly.

In commercial manufacturing, purifying or reducing niobium and tantalum pentachlorides, transfer of the intermediates from one vessel to another through relatively restricted communicating lines or conduits at substantially continuous, controlled flow rates over extended time periods ranging to as high as 500 or more hours must be undertaken.

In general, vapor-phase transfer is advantageous because it is easier to meter vapor than liquid, especially at low flow rates, and because the end product is not contaminated by relatively non-volatile corrosion products formed in metal conduits, whereas these corrosion products are dissolved in liquid $NbCl_5$ or $TaCl_5$ and carried along in the transfer process. In the specific application of transferring and introducing these chlorides into a reduction reactor, which must be maintained at a temperature above 550° C., it is much more convenient to effect introduction at the desired continuous feed rate in the vapor state because the critical temperatures are 501° C. for $TaCl_5$ and 528° C. for $NbCl_5$. During vapor phase transfer of these pentachlorides, conventional gas metering and flow control devices are used, the flow through the conduit being conveniently regulated by a needle valve and measured by a differential pressure type orifice meter. However, this mode of transfer also proves difficult because of the problems of apparatus plugging and interruption of operation which occur because of lower chlorides present in the pentachloride vapors.

It is impractical, economically, to produce $TaCl_5$ or $NbCl_5$ in corrosion-resistant equipment composed entirely of platinum metals, glass or ceramics. Platinum metal use is too expensive while glass or ceramics are too fragile for employment. Recourse to equipment made up of other materials, such as stainless steel, nickel and high nickel alloys, also is disadvantageous because of an attendant corrosion penalty arising from lower chlorides formation. For example, on exposure of the molten pentachlorides to direct contact with such equipment, corrosion with reduction of the pentachlorides to lower chlorides occurs in accordance with the following equation:

(1) 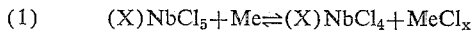

The lower chlorides formed entrain in the pentachloride vapor from the boiler and become deposited in the meter, control valves and communicating pipe lines or conduits of the system. The concentration of tetrachloride (the major $TaCl_5$ and $NbCl_5$ contaminant) is a function of the exposure of the pentachloride as a liquid and vapor to such metallic process equipment, and several days' exposure will prove sufficient to effect formation of troublesome amounts of the subchloride in the vapor.

In the processing of $NbCl_5$ containing about 0.1% $TaCl_5$ vaporized by boiling at 300° C. under 25 p.s.i.g. pressure in a vaporizer constructed of a high nickel base (Inconel) alloy of the approximate composition: 79% Ni, 13% Cr, 6.5% Fe, balance small amounts of Mn, Si, and Cu, and which is provided with a 1" Inconel conduit and flow control system connecting the vaporizer with a reduction reactor, plugging deposits of solid, green-black $NbCl_4$ formed in the conduit and coated the surfaces of the control instruments after 30 hours of operation. This occurred in spite of the fact that during the operation, the Inconel lines and control equipment were maintained at a 315–350° C. range of temperature which was sufficiently high to prevent reflux in the lines and control equipment and as low as practical to minimize corrosion rates. The vaporizer and control equipment were heated by means of conventional furnacing equipment, with current control and regulation being achieved by means of variable auto transformers. Thermocouples welded to the exterior of the line were employed to measure line temperature.

On analysis, the green-black plugging and coating deposit formed under the above conditions was found to consist of 27.01% Nb, 3.22% Ta, 7.1% Ni, 2.2% Fe, 0.89% Cr and 58% Cl. Further analysis revealed that it consisted primarily of $NbCl_4$ and $TaCl_4$-$TaCl_3$ containing small amounts of Fe, Ni, and Cr chlorides.

An obvious method of avoiding $NbCl_4$ deposition would ordinarily be to raise the temperature of the conduit high enough to keep all $NbCl_4$ in the vapor phase. From the ensuing Table I, it will be seen that a 374° C. conduit temperature avoids deposition at $NbCl_4$ partial pressures below 44.1 mm. Hg, and (by extrapolation) a temperature of 400° C. permits NbCl$_4$ partial pressure of about 88 mm. Hg, quite sufficient to prevent plugging:

TABLE I

| T (° C.) | 240 | 300 | 304.2 | 338.3 | 350.1 | 357 | 373.9 |
|---|---|---|---|---|---|---|---|
| NbCl$_5$(l) Vapor Press. (mm. Hg) | 420 | 2,050 | 2,506 | 4,753 | | | |
| NbCl$_4$(s) Vapor Press. (mm. Hg) | | | 3.8 | 8.9 | 18.6 | 20.9 | 44.1 |
| NbCl$_5$ Partial Press. to prevent NbCl$_4$ Disproportionation (mm. Hg) | 12.5 | 230 | 275 | 1,089 | 1,694 | 2,050 | 3,926 |

However, as the temperature rises, NbCl$_4$ vapor tends to disproportionate in accordance with the equation:

(2) $\quad 2NbCl_4(v) \rightleftharpoons NbCl_5(v) + NbCl_3(s)$

The bottom row of Table I shows the vapor pressure of NbCl$_5$ in equilibrium with NbCl$_4$(g) and NbCl$_3$(s), i.e., the NbCl$_5$ pressure which is just adequate to prevent NbCl$_4$ disproportionation.

From the information given in the above table, one would be led to the prediction that when the temperature of the conduit through which the vaporized NbCl$_4$-containing pentachloride is being charged or transferred is increased to above the prevailing 315–375° C. range and to within a range of from 350–500° C., line and apparatus plugging would result due to NbCl$_3$ formation and deposition. In the instance of TaCl$_4$, which is similar though probably more stable, one would predict TaCl$_3$ and TaCl$_2$ formation in accordance with the following equations:

(3) $\quad 2TaCl_4 \rightleftharpoons TaCl_3 + TaCl_5$
$\quad\quad$ 350–400° C.

(4) $\quad 3TaCl_3 \rightleftharpoons 2TaCl_2 + TaCl_5$
$\quad\quad$ 500–600° C.

Quite contrary to these predictions, it has now been surprisingly found that disadvantageous lower chloride formation, decomposition, deposition, and the consequent apparatus plugging and stoppage experienced during prior handling, processing or reduction of vaporous niobium and tantalum pentachlorides can be effectively overcome if the vaporous pentachlorides are maintained during their handling and passage in plant equipment under certain controlled temperature conditions.

Accordingly, it is among the objects of this invention to overcome the prior disadvantages mentioned and to provide novel methods and means for attaining such objects. A particular object is to stabilize vaporous NbCl$_5$ and TaCl$_5$ containing NbCl$_4$ or TaCl$_4$ or mixtures thereof, while passing or transferring the pentachlorides through various conduits and control equipment employed in the plant handling, processing or reduction of such pentachlorides.

These objects are readily attained in this invention which comprises effecting the handling, processing or reduction of niobium and tantalum pentachlorides while maintaining them at temperatures above their boiling points and of an order such that the partial pressure of entrained niobium or tantalum tetrachlorides present will be sufficiently high and disproportion rates will be sufficiently low as to insure passage of the vaporous pentachloride-tetrachloride mixture through a conduit and associated control or other plant equipment and without undesired pentachloride decomposition taking place with its accompanying formation of plugging solid deposits of tetra-, tri-, or dichlorides of niobium or tantalum.

In a more specific embodiment, the invention comprises maintaining the transfer lines, conduits and control equipment employed in handling vaporous niobium and tantalum pentachlorides containing entrained lower chlorides at temperatures ranging from 350–500° C. and at ambient or superatmospheric pressure ranging up to 10–12 atmospheres and even higher.

In a preferred embodiment, the invention comprises conveying niobium and tantalum pentachlorides containing entrained niobium and tantalum tetrachlorides through plant transfer lines, conduits, and control equipment while said lines, conduits, and equipment and their contents are maintained at a temperature ranging from about 375–425° C. and a pressure ranging from about 2–12 atmospheres.

To a clearer understanding of the invention, the following specific examples are given. These are only illustrative of certain adaptations of the invention and are not to be taken as imposing any limiting effect upon the underlying principles and scope of this invention.

*Example I*

This example involves Nb production by the reduction at elevated temperatures within a closed reactor of a vaporous mixture of Nb and Ta pentachlorides with hydrogen preheated to 1000° C., employing a mole ratio of H$_2$ to NbCl$_5$ of 40/1–300/1 in the reaction. The reduction is carried out in a conventional type apparatus made up of a plurality of generators or vaporizers, a continuous type reactor provided with valve-controlled inlets and outlets enabling the separate and continuous introduction at controlled rates of reactants and withdrawal of Nb and the products of reaction. Duplicate one-inch diameter conduits equipped with control valves, isolating valves and orifice type meters interconnected the vaporizers and reaction vessel. Said vaporizers, reactor, communicating conduits and their associated control equipment were composed of the high nickel corrosion resistant alloy Inconel above mentioned. Electrical heating elements were suitably associated with each of the apparatus components mentioned whereby their separate external heating and maintenance at any desired controlled temperature could be undertaken. The surface temperature of the conduits and valve means was indicated by thermocouples suitably secured thereto and temperature control was effected by regulating the current to the electrical heating equipment. Variable transformers were utilized to set the external temperatures of the conduits and control equipment at 375° C.–425° C., and these were continually adjusted throughout the run to maintain such desired range of temperature.

The apparatus was operated by using the electrical heating equipment to externally heat the boilers, which had been previously charged with 490 lbs. of a 99.9% NbCl$_5$–0.1% TaCl$_5$ mixture, to an internal temperature of 300° C. as indicated by internal thermocouples suitably associated with such boilers. This temperature caused the contents to reflux under a vapor pressure of 25 p.s.i.g. while the boilers were isolated from the communicating conduit by suitable valves. Argon was charged through each of the communicating conduits and the reaction vessel for 12 hours to effect air and moisture removal. Prior to opening the isolating valve on a vaporizor, H$_2$ reductant from a source of supply was started in the reactor, after which NbCl$_5$ vapor under a pressure of 25 p.s.i.g., generated by the 300° C. boiler, was fed through the superheated (375°–425° C.) conduit and control devices to the reactor for reduction therein with the H$_2$ at about 850° C. During the run the rate of H$_2$ introduction was, as noted, equivalent to 180 moles of H$_2$ per mole of NbCl$_5$. The reaction was allowed to proceed over a 163-hour period with an average feed rate of 5.36 lbs. per hour of NbCl$_5$ being maintained and until addition of 872 pounds of vaporous chloride was accomplished. Reactor pressure during the run varied between 13 to 23 p.s.i.g. A total of 258 lbs. of substantially pure Nb was obtained from the run, representing an improved 86% yield. Run termination was necessary to remove the metal from the full reactor. No interruption of the run was caused by line plugging nor did lower chloride deposition take place, contrary to that experienced when lower (315–350° C.) conduit operating temperatures are used.

Example II

Employing the apparatus and method described in Example I, Ta metal was produced by reducing TaCl$_5$ by reaction at about 900° C. with hydrogen preheated to 1000° C., with a mole ratio of H$_2$ to TaCl$_5$ of 180–225 being employed in the reaction. Throughout the run, the interconnecting conduits and control equipment were maintained in the range of 350°–500° C. 1050 lbs. of TaCl$_5$ containing 0.11% NbCl$_5$ was processed in the run, the vaporous pentachloride, boiling under 4–5 atmospheres, DMA being continuously passed at an average rate of 6.2 lbs. per hour through said conduits for a period of 169 hours. A total of 328 lbs. of Ta metal was recovered from the run for a 62% yield. As in Example I, no apparatus plugging due to lower chlorides formation and deposition took place in the run, nor were any lower chlorides of Ta or Nb found to exist on the inner surfaces of the conduits when inspected subsequent to the run.

Example III 109 pounds of NbCl$_5$ containing 25% TaCl$_5$ was charged to a conventional stainless steel boiler and heated to the boiling point while the isolating valve on the vessel remained closed. Vaporization was brought about by externally heating the boiler to 260–270° C. by means of an electric heating jacket associated with the boiler and regulated by a variable transformer. A valve controlled vapor outlet from the boiler was connected, by means a ¼″ I.D. silica tube, to an externally heated, 3″ diameter fused silica reduction reactor having valve-controlled inlets and outlets for separately introducing reactants and withdrawing metal and reaction products. The silica tube was provided with a male ball joint connection for interlocking it with a stainless ball joint provided on the vapor outlet from the boiler. A separately operable electrical heating unit was associated with the tube and consisted of electrical resistance wire wrapped directly around the tube. A plurality of thermocouples were also disposed along the length of the tube to record its surface temperature. These were adjusted to a 375–425° C. temperature range which was maintained throughout the duration of the run by appropriate adjustments of a variable transformer employed to regulate the current.

Upon desired vaporization of the pentachlorides in the boiler, its isolating valve was released and vaporized pentachlorides were fed therefrom at a controlled rate through the heated silica tube into the reactor for reaction therein at 850° C. with a 150/1–200/1 mole ratio H$_2$/MCl$_5$ hydrogen preheated to 1000° C. being concurrently fed to the reactor from a separate inlet at a controlled feed rate from a suitable source of supply. An average feed rate of 1.3 pounds per hour of pentachlorides was attained by adjusting the heat input to the boiler which was mounted on a platform balance.

After 84 hours of continuous, uninterrupted feed and passage of the pentachlorides reactants through the conduit to the reactor the run was terminated, and from the full reactor, 25 pounds columbium metal consisting of 67% Nb and 33% Ta was recovered, representing an improved 66% yield. Inspection of the interior of the silica tube after completion of the run, showed it to be free from lower chlorides deposition or build-up.

In a series of runs conducted over a period of several months, an apparatus similar to that described in Example I as well as the methods of that example were used. At the conclusion of these runs, the apparatus was dismantled and carefully inspected for corrosion and lower chloride formation and deposition. A small amount of a pink-yellow solid was found to exist which could be scraped from the internal surfaces of the interconnecting conduits. On analysis this composition was found to consist of 0.3% Nb, 3.7% Fe, 25.7% Ni, 3.16% Cr, and 62% Cl. This indicated that the deposit consisted only of corrosion products of high nickel (Inconel) alloy pipe employed as the interconnecting conduit. For comparison with the base alloy composition, the ratio of metals in the corrosion product were found to be 77.9% Ni, 10.9 Cr, and 11.2% Fe with essentially no columbium or tantalum being present. The material contained no tetrachlorides of columbium or tantalum nor the trichlorides of these elements, as could be expected at 400 ±25° C. from Table I above. For instance, it is seen by extrapolating the data in Table I that at 400° C. the NbCl$_5$ pressure required to effectively suppress the disproportionation of NbCl$_4$ is about 8200 mm. Hg, whereas the actual NbCl$_5$ pressure in Example I was only a quarter of that (2050 mm. Hg). The reasons for this are apparently a function of the rate of disproportionation of the tetrachlorides as shown in Equations 2 and 3 above. Actually the rate of decomposition is unexpectedly slow in the range of 350–500° C., because experiments similar to those described in Example I produce results varying only in the quantity of conduit corrosion products in cases where the metal pipe was used.

From the foregoing, it is evident that the invention embodies as already noted the stabilization of vaporous NbCl$_4$ and TaCl$_4$ in vaporous Nb and Ta pentachlorides by regulating and controlling their temperatures and pressures to such an extent that the partial pressure of the tetrachlorides will be sufficiently high and disproportionation rates will be sufficiently low to assure uninterrupted passage of a vaporous pentachloride-tetrachloride mixture through the interconnecting conduits and associated equipment without encountering any objectionable formation or deposition of objectionable plugs of tetra-, tri-, or dichloride niobium and tantalum solids.

While the invention has been described above in its application to certain preferred, specific embodiments, it obviously is not limited thereto. Thus, while recourse has been had to specific heating means for providing the temperature controls necessary to be effected under the invention while charging the vaporized pentachlorides through various conduits and control equipment, any conventional type of electrical or other form of heating or furnacing means adapted to be associated with the equipment in question and to provide the contemplated temperature control can be employed. Again, while certain reaction temperatures have been specified in the examples as contemplated for use, temperatures ranging from 750–850° C. can be utilized in the reduction process for effecting niobium production while temperatures ranging from 800–875° C. are contemplated for use in the production of tantalum. Similarly, near stoichiometric amounts of metallic reducing agent can be employed for reaction with the niobium and tantalum pentachlorides, whereas H$_2$ is effective only when used in large excess proportions. Where the H$_2$ reductant is employed, use is contemplated of mole ratios of H$_2$ to chloride ranging from 40/1 to 300/1, and preferably from 80/1 to 225/1 when niobium preparation is undertaken. When tantalum production is being effected, such ratio can range from 100/1 to 300/1–DMH.

I claim as my invention:

1. A process for stabilizing a vaporous pentachloride of a metal selected from the group consisting of niobium and tantalum against deposition of a lower chloride present in the vapor during its passage from one vessel to another through a transfer conduit which comprises maintaining said conduit during said passage under a temperature ranging from 350° C. to 500° C.

2. A process for stabilizing a vaporous pentachloride of a metal selected from the group consisting of niobium and tantalum against deposition of a lower chloride present in the vapor during its passage from one vessel to another through a transfer conduit which comprises maintaining said conduit during said passage under a temperature ranging from 375° C. to 425° C.

3. A process for stabilizing a vaporous pentachloride of a metal selected from the group consisting of niobium and tantalum against deposition of a lower chloride present in the vapor during its passage from one vessel to another through a transfer conduit which comprises maintaining said conduit during said passage under a temperature ranging from 350° C. to 500° C. and a pressure ranging up to 12 atmospheres.

4. A process for stabilizing a vaporous pentachloride of a metal selected from the group consisting of niobium and tantalum against deposition of a lower chloride present in the vapor during its passage from one vessel to another through a transfer conduit which comprises maintaining said conduit during said passage under a temperature ranging from 375° C. to 425° C. and a pressure of from 2 to 12 atmospheres.

5. A method for transferring vaporous lower chloride-containing $NbCl_5$ from a vaporizer to a reduction reactor without lower chloride deposition which comprises effecting said passage through an intercommunicating conduit connecting said vaporizor and reactor while separately maintaining said conduit under a temperature ranging from 375° C. to 425° C.

6. A method for transferring vaporous lower chloride-containing $TaCl_5$ from a vaporizer to a reduction reactor without lower chloride deposition which comprises effecting said passage through an intercommunicating conduit connecting said vaporizer and reactor while separately maintaining said conduit under a temperature ranging from 375° C. to 425° C.

References Cited by the Examiner
UNITED STATES PATENTS

| | | | |
|---|---|---|---|
| 2,766,112 | 10/1956 | Schafer | 75—84.5 |
| 2,889,221 | 6/1959 | Singleton | 75—84.5 |
| 3,020,148 | 2/1962 | Jenkins et al. | 75—84.5 |
| 3,078,082 | 2/1963 | Hnilicka | 75—84.5 |

References Cited by the Applicant
UNITED STATES PATENTS 3,020,148   2/1962   Jenkins et al.

BENJAMIN HENKIN, *Primary Examiner.*